INVENTOR
Hubert F. Bauman

May 17, 1960     H. F. BAUMAN     2,937,220
ELECTRICAL BATTERIES
Filed Oct. 23, 1956     2 Sheets-Sheet 2
FIG. 3
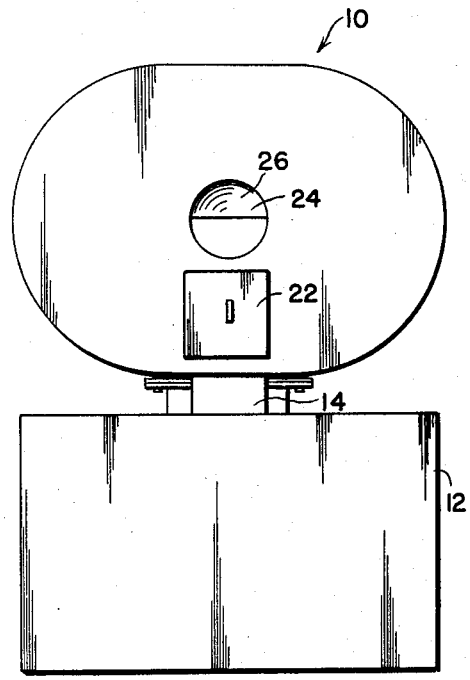
FIG. 4
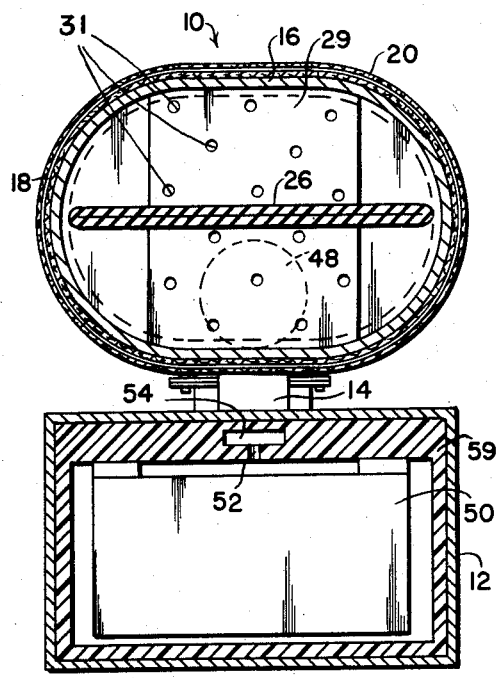
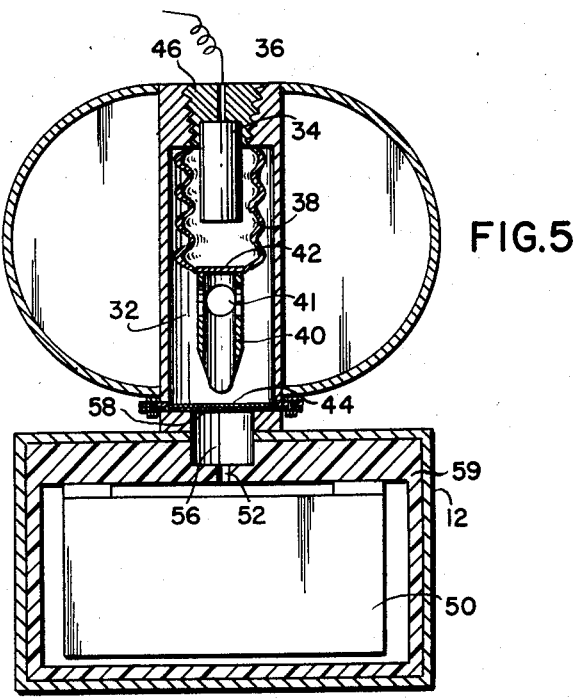
FIG. 5
*INVENTOR*
Hubert F. Bauman
by
*ATTORNEY*

United States Patent Office 2,937,220
Patented May 17, 1960

2,937,220

ELECTRICAL BATTERIES

Hubert F. Bauman, Naperville, Ill., assignor, by mesne assignments, to The Electric Storage Battery Company Application October 23, 1956, Serial No. 617,853

3 Claims. (Cl. 136—90)

This invention relates to electrical batteries and more particularly to electrolyte filling devices for batteries of the deferred action type.

For certain electrical requirements it is desirable that batteries be stored in a "dry charge" state and that they have mechanisms associated therewith for activation by filling them with electrolyte upon demand. Such mechanisms are usually required to fill the battery with a substantial amount of electrolyte in a comparatively short period of time. Furthermore, the filling must often be done under environmental conditions where an extremely low temperature exists so that heating of the electrolyte is generally another requirement. In the past, deferred action batteries generally have been filled by the use of an inert gas maintained under pressure and released at the instant of filling to force the electrolyte into the empty cells. Although the action is positive, it has a disadvantage in that gas under high pressure must be associated with the actuating mechanisms. In addition to the usual problems associated with the handling of high pressure gas, the danger of a premature release of the gas prior to operation of a suitable triggering mechanism is increased.

To overcome this disadvantage, batteries have been constructed which maintain the cells to be filled in an evacuated condition and store the electrolyte in a flexible bag. When a seal is broken between the stored electrolyte bag and the evacuated cells, atmospheric pressure is used to force the electrolyte into the cells by collapsing the bag. Such an arrangement has a disadvantage in that heating of the electrolyte becomes very difficult. In order to allow the atmospheric pressure to collapse the bag, it must be constructed of a resilient material. Then, any heating device which surrounds the electrolyte bag must also be flexible and collapsible so as to allow the bag to collapse properly during the filling procedure. Such apparatus is difficult to construct and is generally unsatisfactory.

Another disadvantage in the use of a collapsible electrolyte receptacle is that it is difficult to provide a triggering mechanism which will cooperate with such a receptacle to quickly and positively discharge a large quantity of electrolyte into the cells upon demand.

It is therefore an object of the invention to provide a deferred action battery of the evacuated cell type having a rigid and easily heated electrolyte receptacle.

It is another object of the invention to provide an improved mechanism for quickly and positively discharging a large volume of electrolyte into the evacuated cells of a deferred action battery.

It is still another object of the invention to provide a means for heating the electrolyte of a deferred action battery which utilizes an electrolyte receptacle with collapsible walls.

For a better understanding of the invention, together with other and further objects thereof, reference is made to the following detailed description taken in connection with the accompanying drawings, in which:

Fig. 3 is an end elevation of the battery.

Fig. 4 is a sectional end elevation taken along the lines 4—4 of Fig. 1.

Fig. 5 is a sectional end elevation taken along the lines 5—5 of Fig. 1.

Figures 1, 2:
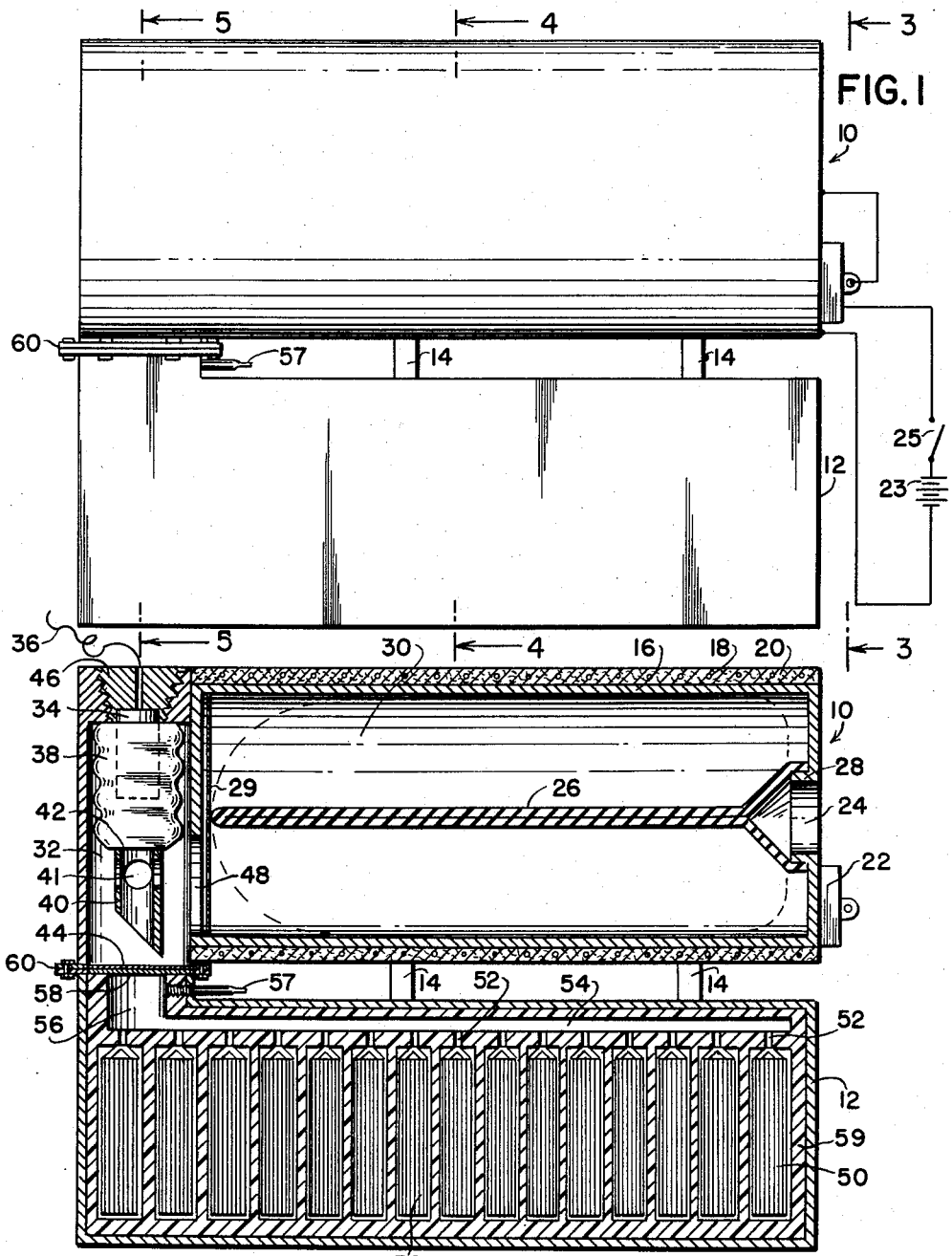
Fig. 1 is a side elevation of a battery embodying the principles of the invention.
Fig. 2 is a sectional side elevation of Fig. 1.

Referring now to the drawings, a battery comprising an embodiment of the present invention is shown in general outline in Fig. 1. The battery has a metal receptacle 10 in which electrolyte is stored prior to activation and a plurality of cells contained within another metal receptacle 12 which is evacuated and sealed through pinched off tube 57. When the battery is activated, as will be described in detail below, electrolyte from reservoir 10 is forced by atmospheric pressure applied to an inflatable bag 26 into the evacuated cell receptacle 12 thereby activating the cells immediately. The electrolyte receptacle 10 is supported by suitable supporting brackets 14 which are affixed to the receptacle and cell case 12.

The battery is shown in greater detail in Fig. 2. It is desirable upon activation that the battery be placed into a fully charged condition, and that its full capacity be available to the user. Accordingly, in extremely low temperature applications, the electrolyte must be heated from an external source in order to maintain proper temperature therein so that the battery will deliver its full capacity regardless of the ambient temperature. Thus, electrolyte receptacle 10 has metal walls 16, preferably cylindrical in configuration, for uniformly conducting heat to the electrolyte without developing hot spots in the receptacle walls. The receptacle is surrounded by heating element wires 18 which may be coated with a material having good heat conducting qualities, but yet is an electrical insulator, such as one of the polyethylene derivatives. These wires are held in position about walls 16 by a suitable heat-resistant, insulating and binding cement. The wires may then be covered with asbestos or other wrapping material 20 to confine the generated heat to the environment of the walls of receptacle 10. A thermostatic element 22 responsive to changes in ambient temperature is connected in series with heating wires 18. Element 22 is adapted to regulate the current in wires 18 in the usual manner in accordance with changes in ambient temperature. The heating current is supplied by an external power supply, shown in diagrammatic notation in Fig. 1 as a battery 23 with a suitable actuating switch 25.

One end of electrolyte receptacle 10 has an aperture 24 therein which opens into a flexible bag or bladder 26 formed from a suitable rubber or plastic compound. Bladder 26 is sealed about walls 28 of aperture 24 so that the interior 30 of receptacle 10 is completely shut off from the surrounding environment. The other end of electrolyte receptacle 10 has a chamber 32 in which an activating device is mounted.

This device comprises an electrical squib or primer 34 having electrical connecting leads 36 which may be connected through a firing switch to a suitable source of energy (not shown). A bellows 38 surrounds squib 34 and has a substantially cylindrical knife 40 attached to its bottom surface 42. Knife 40 has orifices 41 in the walls thereof which allow electrolyte to flow into chamber 12 through the knife when bellows 38 is in an extended position. A rupturable diaphragm 44 seals one end of chamber 32 while bellows 38 closes off the other end of the chamber. Thus, a threaded plug 46 with squib 34 attached may be threadedly inserted into one end of chamber 32 just prior to activation of the battery without disturbing the internal chamber seals. The interior volume of receptacle 10 communicates with chamber 32 by means of an opening 48. The entire volumes of chambers 30 and 32 may be filled with a suitable electrolyte, such as potassium hydroxide or the like in the case of a silver zinc battery. The electrolyte is prevented from leaking to the external environment by means of the liquid-tight seals associated with bladder 26, diaphragm 44 and bellows 38. A baffle plate 29, having a plurality of apertures 31 therein so that electrolyte flow is not impeded, is mounted within receptacle 10 near chamber 32 to prevent the possibility of bag 26 expanding unequally and closing aperture 48 when the battery is activated. Even though bag 26 expands against plate 29, electrolyte will flow freely through the apertures 31 and between the plate and wall of chamber 32 into port 56.

Cell container 12 has a plurality of cells 50 which, for purposes of illustration, are shown in Fig. 2 as cells of the silver zinc type. However, it will be understood that the activator is adapted to be used with any type of cell structure or chemical composition and is not limited to use in connection with silver zinc cells.

Each cell 50 has selected electrodes and separators therein, and also has a channel or duct 52 which communicates with a manifold duct 54 which, in turn, opens into a port 56. The entrance to port 56 is covered with a second rupturable, resilient diaphragm 58 which may be identical in form and material with diaphragm 44.

During assembly operations, cell container 12 is evacuated by suitable vacuum pumping equipment through a sealable tube 57 mounted in the neck thereof. Diaphragm 58 is then sealed across the opening of port 56 so as to preserve the vacuum condition within cell receptacle 12. In order to maintain a high vacuum, it is preferable to form cell container 12 from metal and completely enclose cells 50. Thus, the cells may be embedded or molded from a suitable plastic material and formed into their own container 59 which is inserted in metal receptacle 12. The cells 50 may be formed integrally with ducts 52, manifold 54 and ports 56. After diaphragm 58 has been sealed, receptacle 10, having been filled with electrolyte and sealed by diaphragm 44, may then be mounted in place so that diaphragms 44 and 58 lie in abutting registry with each other. A flanged collar 60, mounted about the necks of containers 10, 12 respectively is then fastened to secure alignment of diaphragms 44, 58. Brackets 14 are then affixed in position to complete the assembly.

In operation, when it is desired to activate the battery, primary squib 34 is electrically energized so that it explodes and forces bellows 38 to extend downwardly, and forces cylindrical knife 40 through diaphragms 44 and 58 to puncture them. Because of the explosive force exerted by squib 34, bellows 38 is driven beyond its elastic limit and therefore remains in an extended position with knife 40 suspended in port 56. Electrolyte fluid then freely flows from the interior 30 of receptacle 10, through opening 48 in chamber 30 and opening 41 in knife 40, through the hollow interior thereof, and into manifold 56.

A pressure differential now exists between two sections of the battery which have been brought into communication with each other upon the rupturing of diaphragms 44 and 58, namely electrolyte chamber 30 which was filled at atmospheric pressure and evacuated cells 50. Atmospheric pressure applied through orifice 24 therefore causes bag 26 to inflate and force the electrolyte positively into cells 50 with considerable force to fill the evacuated spaces and reduce the pressure differential. Cells 50 which were preferably stored in a "dry charge" condition are thereby actuated.

In the event that the temperature of the surrounding atmosphere is below a predetermined level, thermostat 22 causes current to flow from an external power source 23 through heating element wires 18 so as to heat the electrolyte within receptacle 10. Inasmuch as the external walls of the receptacle itself are not required to collapse during the filling process, they may be made of a metallic material and the heating elements may be made of convention wire material without regard to flexibility.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

I claim:

1. A deferred action battery comprising a first receptacle having a plurality of cells having battery electrodes in a dry unactivated condition, a manifold in communication with each of said cells, first rupturable sealing means for sealing said manifold, a second receptacle for containing electrolyte, second rupturable sealing means for sealing said second receptacle, means for removably attaching said second receptacle to said first receptacle so that said first and second sealing means lie in juxtaposition, means operative in response to an external signal for rupturing said first and second sealing means, and means adapted to transmit a differential pressure to said electrolyte to drive said electrolyte from said second receptacle into said first receptacle to activate the battery electrodes therein upon the rupture of said first and second sealing means.

2. A deferred action battery as specified in claim 1 wherein said means for rupturing said first and second sealing means comprises a tubular member acting as a conduit for said electrolyte.

3. A deferred action battery as specified in claim 1 wherein said means for rupturing said first and second sealing means comprises an extendable bellows disposed in said second receptacle, a cutting device fixed to said bellows, and means for permanently extending said bellows to cause said cutting device to rupture said first and second sealing means.

References Cited in the file of this patent

UNITED STATES PATENTS

| 2,404,144 | Riggs et al. | July 16, 1946 |
| 2,529,511 | Murphy | Nov. 14, 1950 |
| 2,624,767 | Moulton | Jan. 6, 1953 |
| 2,674,946 | Hjelm | Apr. 13, 1954 |
| 2,810,776 | Brill et al. | Oct. 22, 1957 |
| 2,824,164 | Bauman | Feb. 18, 1958 |
| 2,826,627 | Aldrich | Mar. 11, 1958 |

FOREIGN PATENTS

| 1,110,510 | France | Sept. 9, 1954 |

OTHER REFERENCES

Cooper et al.: German application Ser. No. Y 136 IV a/21b, printed Nov. 15, 1956 (KL, 21b, Gr 401), 3 pages spec., 1 sheet dwg.